United States Patent Office 3,577,558
Patented May 4, 1971

3,577,558
1-AMINOALKYLAMINO-4-ALKOXYMETHYL-THIOXANTHENE DERIVATIVES
David Rosi, East Greenbush, N.Y., assignor to
Sterling Drug Inc., New York, N.Y.
No Drawing. Filed Apr. 15, 1968, Ser. No. 721,190
Int. Cl. C07d 65/16, 7/42; A61k 27/00
U.S. Cl. 260—328                                     5 Claims

ABSTRACT OF THE DISCLOSURE 1-aminoalkylamino - 4 - (lower-alkoxymethyl)thioxanthenes, -thioxanthene-S-oxides or -dioxide, -xanthenes and -9-one derivatives thereof, having schistosomicidal activity, are prepared by reacting the corresponding 4-hydroxymethyl compounds with a lower-alkanol in an acidic medium, e.g., in the presence of a strong acid, e.g., p-toluenesulfonic acid.

This invention relates to compositions of matter of the class of substituted thioxanthenes and xanthenes, and to their preparation.

The invention sought to be patented, in its composition aspect resides in the class of compounds which I depict as having a molecular configuration in which lower-alkoxymethyl is attached to the 4-carbon atom of a thioxanthene, a thioxanthene-S-oxide or -dioxide, and 9-one derivatives thereof, having attached to the 1-carbon atom thereof a (lower-secondary or -tertiary-amino)-(polycarbon-lower-alkyl)amino substituent. The embodiments of this composition aspect of the invention, when tested according to standard chemotherapeutic evaluation procedures have the inherent applied use characteristics of having schistosomicidal activity. The compounds thus are useful as schistosomicidal agents for treatment of mammalian subjects.

The invention sought to be patented, in its process aspect, resides in the process of preparing the above compounds which comprises reacting the corresponding 4-hydroxymethyl compound with a lower-alkanol in an acidic medium.

Without limiting the generality of the foregoing, illustrative and preferred embodiments of the composition aspect of the invention are those of Formula I

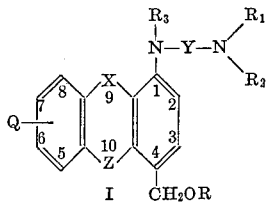

I where X is carbonyl ($>C=O$) or methylene ($>CH_2$), Z is —O—, —S—, $>SO$ or $>SO_2$, Q is hydrogen or from one to three substituents at positions 5, 6, 7 and 8 of the tricyclic ring selected from halo, lower-alkyl or lower-alkoxy, R is lower-alkyl, Y is lower-alkylene having from two to four carbon atoms and having its two connecting linkages on different carbon atoms, $R_3$ is hydrogen or lower-alkyl, $R_1$ is hydrogen, lower-alkyl or lower-2-hydroxy-alkyl and $R_2$ is lower-alkyl or lower-2-hydroxyalkyl, and where $R_1$ and $R_2$ taken with N, i.e., $NR_1R_2$, comprehends saturated N-heteromonocyclic radicals having five to six ring atoms, illustrated by piperidino, hexamethyleneimino, pyrrolidino, morpholino, piperazino and lower-alkylated derivatives thereof.

Also comprehended by the invention are the 5,6,7,8-tetrahydro derivatives of Formula I.

The terms "lower-alkyl" and "lower-alkoxy," as used herein, e.g., as meanings for Q in Formula I or for R, $R_1$, $R_2$ or $R_3$ (when lower-alkyl), mean alkyl and alkoxy radicals having from one to six carbon atoms, illustrated by methyl, ethyl, n-propyl, isopropyl, n-butyl, 2-butyl, isobutyl, n-amyl, n-hexyl, and the like, for lower-alkyl, and by methoxy, ethoxy, n-propoxy, isopropoxy, n-butoxy, 2-butoxy, n-hexoxy, and the like, for lower-alkoxy.

The term "halo," as used herein, e.g., as one of the meanings for Q in Formula I, means chloro, bromo, iodo, or fluoro, with chloro being preferred because of the ready availability and lower-cost advantages of chloro intermediates.

The term "lower-2-hydroxyalkyl," as used herein, e.g., as a meaning for $R_1$ and $R_2$ in Formula I, are hydroxyalkyl radicals having from two to six carbon atoms and having the hydroxy group attached to the carbon atom that is one carbon atom removed from the side chain nitrogen atom, illustrated by 2-hydroxyethyl, 2-hydroxypropyl, 2-hydroxybutyl, 2-hydroxyhexyl, and the like.

The term "lower-alkylene," as used herein, e.g., as represented by Y in Formula I, are alkylene radicals having from two to fur carbon atoms and having its two connecting linkages on different carbon atoms, illustrated by —CH₂CH₂—, —CH(CH₃)CH₂—, —CH₂CH(CH₃),
—CH(CH₃)CH(CH₃), —CH(C₂H₅)CH₂—, CH₂CH₂CH₂—,
—CH₂CH₂CHCH₃, —CH₂CH₂CH₂CH₂— and the like.

When $NR_1R_2$ of Formula I comprehends (lower-alkylated)-N-heteromonocyclic radicals, lower-alkyl radicals can be attached to any available ring-atom and can vary preferably from one to three in number, e.g.

2-methylpiperidino,
3-ethylpiperidino,
4-methylpiperidino,
2,6-dimethylpiperidino,
2,4-dimethylpiperidino,
2,4,6-trimethylpiperidino,
3-n-propylpiperidino,
2,2-dimethylpiperidino,
2-methylpyrrolidino,
2,5-dimethylpyrrolidino,
2,3-dimethylmorpholino,
2-ethylmorpholino,
2-methylhexamethyleneimino,
2,7-dimethylhexamethyleneimino,
4-methylpiperazino, 3-ethylpiperazino,
2,4,6-trimethylpiperazino,
and the like.

The compounds of Formula I are useful in the free base form or in the form of their acid-addition salts, and both forms are within the purview of the invention, and are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, chemotherapeutically acceptable salts, that is, salts whose anions are relatively innocuous to the animal organism in chemotherapeutic doses of the salts, so that the beneficial properties inherent in the free base are not vitiated by side effects ascribable to the anions; in other words, the latter do not substantially affect the chemotherapeutic properties inherent in the cations. Appropriate chemotherapeutically acceptable salts within the scope of the invention are those derived from mineral acids such as hydrochloric acid, hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, 3-hydroxy-2-naphtholic acid, pamoic acid (2,2'-dihydroxy-1,1'-di-naphthylmethane-3,3'-dicarboxylic acid), naponic acid (1,5-naphthalenedisulfonic acid), and the like, giving the hydrochloride, hydrobromide, hydriodide, nitrate, phosphate, sulfamate, sulfate, acetate, citrate, tartrate, lactate, methanesulfonate, ethanesulfonate, quinate, 3-hydroxy-2-naphthoate, pamoate and naponate, respectively.

The acid-addition salts are prepared preferably by reacting the free base and acid in an organic solvent, e.g., ethanol, in which case the salt separates directly or can be obtained by concentration of the solution.

Although chemotherapeutically acceptable salts are preferred, all acid-addition salts are within the scope of the invention. All acid-addition salts are useful as sources of the free base form even if the particular salt per se is not desired as the final product, as for example when the salt is formed for purposes of purification or identification, or when it is used as an intermediate in preparing a chemotherapeutically acceptable salt by ion exchange procedures.

The molecular structures of said compounds of the invention are assigned on the basis of evidence provided by infrared (IR), ultraviolet (UV) and nuclear magnetic resonance (NMR) spectra, by chromatograph mobilities, and, by the correspondence of calculated and found values for the elementary analyses for representative examples.

The manner of making and using our invention will now be generally described so as to enable the person skilled in the art of organic chemistry to make and use the same.

In carrying out the process of the invention, the intermediate 4-hydroxymethyl compound having the Formula I where R is hydrogen is reacted with a lower-alkanol in an acidic medium. The reaction is carried out preferably by heating said reactants in the presence of a strong acid, e.g., an organic sulfonic acid such as benzenesulfonic acid, p-toluenesulfonic acid, ethanesulfonic acid or methanesulfonic acid or a strong inorganic acid such as hydrochloric or sulfuric acid. In practicing the invention, it was found convenient to use p-toluenesulfonic acid as the strong acid and to use an excess of the appropriate intermediate lower-alkanol as solvent for the reaction. The reaction temperature can be varied within the range of about 50 to 150° C., with a preferred range of about 65 to 120° C.

Said intermediate 4-hydroxymethyl compounds (of Formula I where R is hydrogen) are known compounds.

The foregoing presentation is offered to illustrate the various aspects of the invention and not to limit its scope.

The invention is further illustrated by the following examples.

(1) 1 - (2-diethylaminoethylamino)-4-isopropoxymethylthioxanthen-9-one.—To 4.0 g. of 1-(2-diethylaminoethylamino) - 4 - hydroxymethylthioxanthen-9-one in 300 ml. of isopropyl alcohol was added 2.1 g. of p-toluenesulfonic acid monohydrate in 100 ml. of isopropyl alcohol. The reaction mixture was heated on a hot plate for five hours, adding additional isopropyl alcohol to maintain a volume of about 200 ml. The solvent was removed in vacuo and 30 ml. of methylene dichloride was added to dissolve the residue. The solution was applied to eighteen 20 x 40 cm. plates (1 mm. thick) coated with silica gel. The plates were developed in n-hexane(9):triethylamine (1) (v./v.). The least polar band from each plate was removed; said bands were combined and eluted with 400 ml. of methanol. The methanol solution was filtered through an ultrafine sintered glass funnel and the methanol was removed by distilling in vacuo. The residue was dissolved in 25 ml. of ethyl acetate. The ethyl acetate solution was washed with 25 ml. of water containing 1 drop of 10 N sodium hydroxide and the ethyl acetate was then removed under reduced pressure. The remaining material was dried in a vacuum oven at 45° C. over phosphorus pentoxide and paraffin to yield 2.24 g. of 1-(2-diethylaminoethylamino-4-isopropoxymethylthioxanthen-9 - one, M.P. 52–53° C.

(2) 1 - (2-diethylaminoethylamino)-4-methoxymethylthioxanthen-19-one.—To 4 g. of 1-(2-diethylaminoethylamino) - 4-hydroxymethylthioxanthen-9-one dissolved in 300 ml. of methanol was added 2.1 g. of p-toluenesulfonic acid monohydrate dissolved in 100 ml. of methanol. The solution was heated on a steam bath for 12 hours and the methanol removed in vacuo. The oily residue was dissolved in 50 ml. of methylene dichloride. The methylene dichloride solution was washed with 25 ml. of water, made alkaline with sodium hydroxide, washed over anhydrous sodium sulfate, filtered and concentrated to a volume of 25 ml. This solution was applied to ten 20 x 40 cm. silica gel plates each 1 mm. thick. The plates were developed in n-hexane(9):isopropylamine(1)(v./v.). The band less polar than that of the 4-hydroxymethyl starting material was removed from each plate; all such bands were combined and eluted with methanol. The methanol solution was filtered and evaporated in vacuo to remove the solvent. The residue was dissolved in 50 ml. of methylene dichloride. The resulting solution was washed with 25 ml. of water, filtered through an ultrafine sintered glass funnel, dried over anhydrous sodium sulfate, filtered and evaporated to remove the methanol. The residue was dried in a vacuum oven at 60° C. for 12 hours to yield 3.1 g. of 1 - (2-diethylaminoethylamino)-4-methoxymethylthioxanthen-9-one, M.P. 61–62° C.

(3) 1-(2-diethylaminoethylamino)-4-ethoxymethylthioxanthen-9-one, M.P. 73–74° C., 3.5 g., was prepared following the procedure described in Example 2 using 4 g. of 1 - (2-diethylaminoethylamino)-4-hydroxymethylthioxanthen-9-one in 300 ml. of ethanol, 2.1 g. of p-toluenesulfonic acid monohydrate in 100 ml. of ethanol, and a reflux period of 12 hours.

(4) 1-(2-diethylaminoethylamino)-4-n-propoxymethylthioxanthen-9-one, M.P. 50–51° C., 3.29 g., was prepared as in Example 2 using 4 g. of 1-(2-diethylaminoethylamino)-4-hydroxymethylthioxanthen-9-one in 100 ml. of n-propanol, 2.1 g. of p-toluenesulfonic acid monohydrate in 25 ml. of n-propanol and a heating period of 12 hours.

(6) 1 - (2 - diethylaminoethylamino) - 4 - n-hexyloxymethylthioxanthen-9-one is prepared by following the procedure described in Example 5 using n-hexanol in place of isoampy alcohol.

Following the procedure described in Examples 1 or 2 using molar equivalent quantities of the appropriate corresponding 1 - (aminoethylamino) - 4 - hydroxymethylthioxanthen-9-one, -S-oxide or S-dioxide, or -xanthen-9-one in place of 1-(2-diethylaminoethylamino) - 4 - hydroxymethylthioxanthen-9-one and the appropriate lower-alkanol, the corresponding 4-(lower-alkoxymethyl) compounds of Table A are prepared:

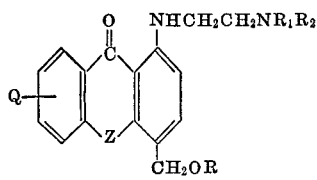

TABLE A

| Example | Q | Z | NR₁R₂ | R |
|---|---|---|---|---|
| 7 | 6-Cl | S | N(C₂H₅)(CH₂CH₂OH) | CH₃ |
| 8 | H | SO | N(C₂H₅)₂ | CH(CH₃)₂ |
| 9 | 7-Br | O | Same as above | C₂H₅ |
| 10 | H | O | NC₅H₁₀ ᵃ | CH(CH₃)₂ |
| 11 | H | S | N(H)(CH₂CH₂OH) | C₂H₅ |

TABLE A—Continued

| Example | Q | Z | NR₁R₂ | R |
|---|---|---|---|---|
| 12 | H | O | NC₆H₁₂ ᵇ | CH₃ |
| 13 | H | S | Same as above ᵇ | CH(CH₃)₂ |
| 14 | H | S | NC₅H₁₀ ᵃ | Same as above. |
| 15 | 6-Cl | S | N(C₂H₅)₂ | Do. |
| 16 | 6-Cl | S | NC₆H₁₂ ᵇ | Do. |
| 17 | H | SO₂ | N(C₂H₅)₂ | Do. |
| 18 | 6-Cl | O | Same as above | Do. |
| 19 | H ᶜ | S | ....do.... | Do. |
| 20 | H | S | NC₇H₁₄ ᵈ | Do. |
| 21 | 6-Cl | S | N(C₂H₅)(CH₂CH(OH)CH₃) | Do. |
| 22 | H | S | NHCH₂CH₂OH | Do. |

ᵃ NC₅H₁₀=piperidino.
ᵇ (NC₆H₁₂=2-methylpiperidino.
ᶜ .5,6,7,8-tetrahydro compound.
ᵈ NC₇H₁₄=2-ethylpiperidino.

Following the procedure described in Examples 1 or 2 using molar equivalent quantities of the appropriate corresponding 1-(aminoalkylamino) - 4 - hydroxymethylthioxanthene, -thioxanthene-S-oxide or -dioxide, -xanthene, or 9-one derivatives thereof, in reaction with the appropriate alkanol, the corresponding 4-(lower-alkoxymethyl) compounds of Table B are prepared:

TABLE B

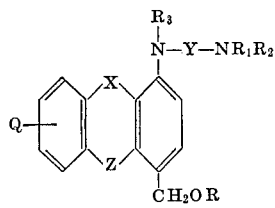

| Example | X | Z | R₃ | Y | NR₁R₂ | Q | R |
|---|---|---|---|---|---|---|---|
| 23 | CH₂ | — | H | CH₂CH₂ | N(C₂H₅)₂ | H | CH₂CH₂CH₃ |
| 24 | CH₂ | S | H | Same as above | Same as above | H | CH(CH₃)₂ |
| 25 | C=O | SO | H | ....do.... | ....do.... | H | Same as above. |
| 26 | CH₂ | SO₂ | H | ....do.... | ....do.... | H | Do. |
| 27 | C=O | O | H | ....do.... | N(C₂H₅)(CH₂CH₂OH) | H | Do. |
| 28 | CH₂ | O | H | ....do.... | N(C₂H₅)₂ | H | CH₂CH₃ |
| 29 | CH₂ | O | H | ....do.... | Same as above | H | CH(CH₃)₂ |
| 30 | C=O | O | H | (CH₂)₃ | NC₅H₁₀ ᵃ | 6—Cl | Same as above. |
| 31 | C=O | O | H | (CH₂)₄ | NC₄H₈ ᵇ | 7—CH₃ | Do. |
| 32 | C=O | O | H | CH₂CH₂ | N(C₄H₉-n)₂ | 8-OCH₃ | Do. |
| 33 | C=O | O | H | CH(CH₃)CH₂ | N(CH₃)₂ | 5-Cl | Do. |
| 34 | C=O | S | CH₃ | CH₂CH₂ | N(C₂H₅)₂ | H | Do. |
| 35 | C=O | S | H | CH₂CH(CH₃) | N(CH₃)₂ | H | Do. |
| 36 | C=O | S | H | CH₂CH₂ | NC₄H₈ ᵇ | H | Do. |
| 37 | C=O | S | C₂H₅ | (CH₂)₄ | N(C₂H₅)₂ | 5-CH₃ | Do. |
| 38 | C=O | S | H | CH₂CH₂ | N(C₆H₁₃-n)₂ | 7-Cl | Do. |
| 39 | C=O | S | H | Same as above | NC₄H₈O ᶜ | 7-Br | Do. |
| 40 | C=O | S | H | ....do.... | NC₆H₁₂ ᵈ | 7-OC₂H₅ | Do. |
| 41 | C=O | S | H | ....do.... | NC₆H₁₂ ᵉ | 8—CH₃ | C₂H₅ |
| 42 | C=O | S | H | ....do.... | NC₇H₁₄ ᶠ | 6,7-(OCH₃)₂ | CH₃ |
| 43 | C=O | S | H | ....do.... | N(C₂H₅)₂ | 5,6,7-(CH₃)₃ | CH₃ |
| 44 | C=O | S | H | ....do.... | NHC₂H₅ | H | CH(CH₃)₂ |
| 45 | C=O | S | H | ....do.... | NHCH₂CH₂OH | H | Same as above. |
| 46 | C=O | S | H | ....do.... | N(C₂H₅)(CH₂CH₂OH) | H | Do. |
| 47 | C=O | S | H | ....do.... | Same as above | H | Do. |
| 48 | C=O | S | H | ....do.... | N(CH₃)₂ | H | Do. |
| 49 | C=O | S | H | ....do.... | N(C₄H₉—n)₂ | H | Do. |
| 50 | C=O | S | H | ....do.... | N(CH₃)₂ | H | Do. |
| 51 | C=O | O | H | ....do.... | N(C₄H₉—n)₂ | H | Do. |
| 52 | C=O | O | CH₃ | ....do.... | N(C₂H₅)₂ | H | Do. |
| 53 | C=O | S | H | ....do.... | N(CH₂CH₂OH)₂ | H | Do. |
| 54 | C=O | S | H | (CH₂)₃ | N(C₂H₅)₂ | H | Do. |

ᵃ NC₅H₁₀=piperidino.
ᵇ NC₄H₈=pyrrolidino.
ᶜ NC₄H₈O=morpholino.
ᵈ NC₆H₁₂=hexamethylenimino.
ᵉ NC₆H₁₂=2,5-dimethylpyrrolidino.
ᶠ NC₇H₁₄=2,6-dimethylpiperidino.

The schistosomacidal activity of the 4-(lower-alkoxymethyl) compounds of the invention (those of Formula I) was established by determining their schistosomacidal effect in mice infected with Schistosoma mansoni according to the standard procedure of Berberian et al., J. Parasitology, 50, 435–440 (1964). The procedure briefly is as follows: Female Swiss mice, 18 to 22 g. in weight, are infected by intraperitoneal injection of 250 S. mansoni cercarie per mouse. Medication is begun thirty-nine days post-infection and continued for five days. Each compound is administered orally as a suspension or a solution in 10% autoclaved gelatin so that the daily dose is contained in 0.4 ml. Each compound is tested in 10 (or 5) mice per dose level. Infection controls (at least 10 animals) are included in each test. The animals are autopsied two to three weeks post-medication; the liver and mesinteric veins are examined for both living and dead worms (schistosomes). The criterion of efficacy is the percentage of worms killed. When tested by this procedure, the compounds of the invention were found to have schistosomacidal activity when administered at oral dose levels between about 6.25 and 400 mg./kg./day for five days.

The 1-(aminoalkylamino)-4-alkoxymethyl compounds of the invention also have been found to have antibacterial activity when tested by standard bacteriological test procedures, thereby indicating their utility as antibacterial agents. For example, when tested by standard in vitro antibacterial test procedures against *Staphylococcus aureus*, they have been found to be active at minimal growth inhibitory concentrations in the range of about 5 to 100 mcg./ml.

I claim:
1. A compound of the formula

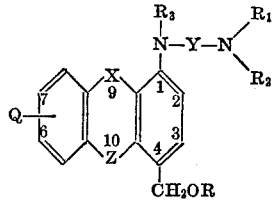

where X is $>C=O$ or $>CH_2$, Z is $-O-$, $-S-$, $>SO$ or $>SO_2$, Q is hydrogen or from one to three substituents at positions 5, 6, 7 and 8 of the tricyclic ring selected from halo, lower-alkyl or lower-alkoxy, R is lower-alkyl, Y is lower-alkylene having from two to four carbon atoms and having its two connecting linkages on different carbon atoms, $R_3$ is hydrogen or lower-alkyl, $R_1$ is hydrogen, lower-alkyl or lower-2-hydroxy-alkyl and $R_2$ is lower-alkyl or lower-2-hydroxyalkyl where $R_1$ and $R_2$ taken with N also is piperidino, hexamethyleneimino, pyrrolidino, morpholino, piperazino or lower-alkylated derivatives thereof; or its 5,6,7,8-tetrahydro derivative.

2. A compound according to claim 1 where X is $>C=O$, Z is $-S-$, Q is hydrogen, $R_3$ is hydrogen, Y is $CH_2CH_2$, and $R_1$ and $R_2$ are each ethyl.

3. 1 - (2 - diethylaminoethylamino)-4-isopropoxymethylthioxanthen-9-one according to claim 2 where R is isopropyl.

4. 1 - (2 - diethylaminoethylamino) - 4 - methoxymethylthioxanthen-9-one according to claim 2 where R is methyl.

5. 1 - (2 - diethylaminodiethylamino) - 4-ethoxymethylthioxanthen-9-one according to claim 2 where R is ethyl.

References Cited

UNITED STATES PATENTS 3,294,803  12/1966  Rosi et al. _____ 260—293.4

OTHER REFERENCES

Fieser et al.: Adv. Org. Chem. (Reinhold, N.Y., 1961), p. 303–4.

Whitmore: Org. Chem. (Van Nostrand, N.Y., 1951), p. 109–10.

HENRY R. JILES, Primary Examiner

C. M. SHURKO, Assistant Examiner

U.S. Cl. X.R.

260—247.1, 247.5, 268, 293.4, 294.7, 326, 335; 424—248, 250, 267, 274, 275, 283

PO-1050
(5/69)

UNITED STATES PATENT OFFICE
CERTIFICATE OF CORRECTION

Patent No. 3,577,558            Dated    May 4, 1971

Inventor(s) David Rosi

It is certified that error appears in the above-identified patent and that said Letters Patent are hereby corrected as shown below:

Column 2, line 33, "fur" should read --four--; line 39, "$CH_2CH_2CH_2$-" should read -- -$CH_2CH_2CH_2$- --. Column 3, line 27, "-naphtholic" should read -- -naphthoic --. Column 4, line 26, "aminoethylamino-4" should read -- aminoethylamino)-4 --; line 29, "-19-" should read -- -9- --; line 69, "isoampy" should read --isoamyl--. Column 6, line 16, "($NC_6H_{12}$" should read --$NC_6H_{12}$--. Column 7, Claim 1, in the formula, insert "5" and "8" to identify their respective positions as in Formula I of column 1.

Signed and sealed this 28th day of March 1972.

(SEAL)
Attest:

EDWARD M. FLETCHER, JR.           ROBERT GOTTSCHALK
Attesting Officer                    Commissioner of Patents